(12) United States Patent  
Anastas et al.

(10) Patent No.: US 7,477,237 B2
(45) Date of Patent: Jan. 13, 2009

(54) SYSTEMS AND METHODS FOR PROVIDING A HAPTIC MANIPULANDUM

(75) Inventors: George Anastas, San Carlos, CA (US); David W. Bailey, Redwood City, CA (US); Gregory Tashjian, Campbell, CA (US); Raymond Yu, San Jose, CA (US)

(73) Assignee: Immersion Corporation, San Jose, CA (US)

( * ) Notice: Subject to any disclaimer, the term of this patent is extended or adjusted under 35 U.S.C. 154(b) by 582 days.

(21) Appl. No.: 10/859,930

(22) Filed: Jun. 3, 2004

(65) Prior Publication Data

US 2005/0007347 A1 Jan. 13, 2005

Related U.S. Application Data

(60) Provisional application No. 60/475,809, filed on Jun. 3, 2003.

(51) Int. Cl.
*G09G 5/08* (2006.01)
*G06F 3/00* (2006.01)

(52) U.S. Cl. ...................................... 345/167; 715/701
(58) Field of Classification Search ................... 345/167
See application file for complete search history.

(56) References Cited

U.S. PATENT DOCUMENTS

| | | | |
|---|---|---|---|
| 3,157,853 A | 11/1964 | Hirsch | |
| 3,220,121 A | 11/1965 | Cutler | |
| 3,497,668 A | 2/1970 | Hirsch | |
| 3,517,446 A | 6/1970 | Cortyon et al. | |
| 3,902,687 A | 9/1975 | Hightower | |
| 3,903,614 A | 9/1975 | Diamond et al. | |
| 4,160,508 A | 7/1979 | Frosch et al. | |
| 4,236,325 A | 10/1980 | Hall et al. | |
| 4,513,235 A | 4/1985 | Acklam et al. | |
| 4,581,491 A | 4/1986 | Boothroyd | |
| 4,599,070 A | 7/1986 | Hladky et al. | |
| 4,708,656 A | 11/1987 | DeVries et al. | |
| 4,713,007 A | 12/1987 | Alban | |
| 4,891,764 A | 1/1990 | McIntosh | |
| 4,930,770 A | 6/1990 | Baker | |
| 4,934,694 A | 6/1990 | McIntosh | |
| 5,019,761 A | 5/1991 | Kraft | |

(Continued)

FOREIGN PATENT DOCUMENTS

DE  44 00 790  5/1995

(Continued)

OTHER PUBLICATIONS

Adelstein, "A Virtual Environment System For The Study of Human Arm Tremor," Ph.D. Dissertation, Dept. of Mechanical Engineering, MIT, Jun. 1989.

(Continued)

*Primary Examiner*—Duc Q Dinh
(74) *Attorney, Agent, or Firm*—Kilpatrick Stockton LLP

(57) ABSTRACT

Systems and methods for providing a haptic manipulandum are described. In one described system, a lever arm is pivotably coupled to a housing, and configured to apply a processor-controlled force to a substantially-spherical manipulandum to provide a haptic effect. The described system may include a processor in communication with an actuator for providing the haptic effect.

9 Claims, 6 Drawing Sheets

U.S. PATENT DOCUMENTS

| | | | |
|---|---|---|---|
| 5,022,407 | A | 6/1991 | Horch et al. |
| 5,035,242 | A | 7/1991 | Franklin |
| 5,038,089 | A | 8/1991 | Szakaly |
| 5,078,152 | A | 1/1992 | Bond |
| 5,186,695 | A | 2/1993 | Mangseth et al. |
| 5,212,473 | A | 5/1993 | Louis |
| 5,240,417 | A | 8/1993 | Smithson et al. |
| 5,271,290 | A | 12/1993 | Fischer |
| 5,275,174 | A | 1/1994 | Cook |
| 5,299,810 | A | 4/1994 | Pierce |
| 5,309,140 | A | 5/1994 | Everett |
| 5,334,027 | A | 8/1994 | Wherlock |
| 5,466,213 | A | 11/1995 | Hogan |
| 5,547,382 | A | 8/1996 | Yamasaki |
| 5,766,016 | A | 6/1998 | Sinclair |
| 5,781,172 | A | 7/1998 | Engel et al. |
| 5,784,052 | A | 7/1998 | Keyson |
| 5,785,630 | A | 7/1998 | Bobick et al. |
| 5,914,705 | A | 6/1999 | Johnson et al. |
| 6,111,577 | A | 8/2000 | Zilles et al. |
| 6,219,034 | B1 | 4/2001 | Elbing et al. |
| 6,256,011 | B1 | 7/2001 | Culver |
| 6,422,941 | B1 | 7/2002 | Thorner et al. |
| 6,480,185 | B1 | 11/2002 | Kiljander et al. |
| RE38,242 | E | 9/2003 | Engel et al. |
| 6,707,443 | B2 | 3/2004 | Bruneau et al. |
| 6,809,727 | B2 * | 10/2004 | Piot et al. ............... 345/184 |
| 2003/0038774 | A1 | 2/2003 | Plot et al. |
| 2003/0068053 | A1 | 4/2003 | Chu |

FOREIGN PATENT DOCUMENTS

| | | |
|---|---|---|
| EP | 0349086 | 1/1990 |
| EP | 0 489 469 | 6/1992 |
| EP | 0626634 | 11/1994 |
| JP | 01-003664 | 7/1990 |
| JP | 02-109714 | 1/1992 |
| JP | 04-007371 | 8/1993 |
| JP | 05-193862 | 1/1995 |

OTHER PUBLICATIONS

Adelstein, "Design and Implementation of a Force Reflecting Manipulandum for Manual Control research," DSC-vol. 42, Advances in Robotics, Edited by H. Kazerooni, pp. 1-12, 1992.

Aukstakalnis et al., "Silicon Mirage; The Art and Science of Virtual Reality," ISBN 0-938151-82-7, pp. 129-180, 1992.

Baigrie, "Electric Control Loading—A Low Cost, High Performance Alternative," Proceedings, pp. 247-254, Nov. 6-8, 1990.

Bejczy et al., "Kinesthetic Coupling Between Operator and Remote Manipulator," International Computer Technology Conference, The American Society of Mechanical Engineers, San Francisco, CA, Aug. 12-15, 1980.

Bejczy, "Sensors, Controls, and Man-Machine Interface for Advanced Teleoperation," Science, vol. 208, No. 4450, pp. 1327-1335, 1980.

Bejczy, "Generalization of Bilateral Force-Reflecting Control of Manipulators," Proceedings Of Fourth CISM-IFToMM, Sep. 8-12, 1981.

Bejczy, et al., "Universal Computer Control System (UCCS) For Space Telerobots," CH2413-3/87/0000/0318501.00 1987 IEEE, 1987.

Bejczy et al., "A Laboratory Breadboard System For Dual-Arm Teleoperation," SOAR '89 Workshop, JSC, Houston, TX, Jul. 25-27, 1989.

Brooks et al., "Hand Controllers for Teleoperation-13 A State-of-the-Art Technology Survey and Evaluation," JPL Publication 85-11; NASA-CR-175890; N85-28559, pp. 1-84, Mar. 1, 1985.

Burdea et al., "Distributed Virtual Force Feedback, Lecture Notes for Workshop on Force Display in Virtual Environments and its Application to Robotic Teleoperation," 1993 IEEE International Conference on Robotics and Automation, pp. 25-44, May 2, 1993.

Caldwell et al., "Enhanced Tactile Feedback (Tele-Taction) Using a Multi-Functional Sensory System," 1050-4729/93, pp. 955-960, 1993.

"Cyberman Technical Specification," Logitech Cyberman SWIFT Supplement, Apr. 5, 1994.

Eberhardt et al., "OMAR—A Haptic display for speech perception by deaf and deaf-blind individuals," IEEE Virtual Reality Annual International Symposium, Seattle, WA, Sep. 18-22, 1993.

Eberhardt et al., "Including Dynamic Haptic Perception by The Hand: System Description and Some Results," DSC-vol. 55-1, Dynamic Systems and Control: vol. 1, ASME 1994.

Engel, F. L. et al., "Improved Efficiency Through I- and E-feedback: A Trackball With Contextual Force Feedback," Int. J. Human—Computer Studies, vol. 41, No. 5, 1994, pp. 949-974.

Gobel et al., "Tactile Feedback Applied to Computer Mice," International Journal of Human-Computer Interaction, vol. 7, No. 1, pp. 1-24, 1995.

Gotow et al., "Controlled Impedance Test Apparatus for Studying Human Interpretation of Kinesthetic Feedback," WA11011:00, pp. 332-337.

Howe, "A Force-Reflecting Teleoperated Hand System for the Study of Tactile Sensing in Precision Manipulation," Proceedings of the 1992 IEEE International Conference on Robotics and Automation, Nice, France, May 1992.

IBM Technical Disclosure Bulletin, "Mouse Ball-Actuating Device With Force and Tactile Feedback," vol. 32, No. 9B, Feb. 1990.

Iwata, "Pen-based Haptic Virtual Environment," 0-7803-1363-1/93 IEEE, pp. 287-292, 1993.

Jacobsen et al., "High Performance, Dextrous Telerobotic Manipulator With Force Reflection," Intervention/ROV '91 Conference & Exposition, Hollywood, Florida, May 21-23, 1991.

Jones et al., "A perceptual analysis of stiffness," ISSN 001-4819 Springer International (Springer-Verlag); Experimental Brain Research, vol. 79, No. 1, pp. 150-156, 1990.

Kaczmarek et al., "Tactile Displays," Virtual Environment Technologies.

Keuning, H., "Augmented Force Feedback to Facilitate Target Acquisition in Human-Computer Interaction," Dissertatie Technische Universiteit Eindhoven-Proefschrift, 2003, Universiteitsdrukkerij Technische Universiteit Eindhoven, Eindhoven, The Netherlands.

Keuning-Van Oirschot, H. et al., "Cursor Displacement and Velocity Profiles for Targets in Various Locations," Proceedings of Eurohaptics 2001, United Kingdom, Birmingham, 2001, pp. 108-112.

Keyson, D. V., "Discrimination of Trackball-Produced Forces," Displays, vol. 18, No. 3, May 1998, pp. 143-152, Elsevier.

Keyson, D. V., "Estimation of Virtually Perceived Length," Presence, vol. 9, No. 4, Aug. 2000, pp. 394-398.

Kontarinis et al., "Display of High-Frequency Tactile Information to Teleoperators," Telemanipulator Technology and Space Telerobotics, Won S. Kim, Editor, Proc. SPIE vol. 2057, pp. 40-50, Sep. 7-9, 1993.

Marcus, "Touch Feedback in Surgery," Proceedings of Virtual Reality and Medicine The Cutting Edge, Sep. 8-11, 1994.

Mcaffee, "Teleoperator Subsystem/Telerobot Demonstrator: Force Reflecting Hand Controller Equipment Manual," JPL D-5172, pp. 1-50, A1-A36, B1-B5, C1-C36, Jan. 1988.

Minsky, "Computational Heptics: The Sandpaper System for Synthesizing Texture for a Force-Feedback Display," Ph.D. Dissertation, MIT , Jun. 1995.

Ouh-Young, "Force Display in Molecular Docking," Order No. 9034744, p. 1-369, 1990.

Ouh-Young, "A Low-Cost Force Feedback Joystick and Its Use in PC Video Games," IEEE Transactions on Consumer Electronics, vol. 41, No. 3, Aug. 1995.

Ouhyoung et al., "The Development of a Low-Cost Force Feedback Joystick and Its Use in the Virtual Reality Environment," Proceedings of the Third Pacific Conference on Computer Graphics and Applications, Pacific Graphics '95, Seoul, Korea, Aug. 21-24, 1995.

Patrick et al., "Design and Testing of A Non-reactive, Fingertip, Tactile Display for Interaction with Remote Environments," Cooperative Intelligent Robotics in Space, Rul J. deFiguelredo et al., Editor, Proc. SPIE vol. 1387, pp. 215-222, 1990.

Pimentel et al., "Virtual Reality: through the new looking glass," 2nd Edition; McGraw-Hill, ISBN 0-07-050167-X, pp. 41-202, 1994.

Rabinowitz et al., "Multidimensional tactile displays: Identification of vibratory intensity, frequency, and contactor area," Journal of The Acoustical Society of America, vol. 82, No. 4, Oct. 1987.

Russo, "The Design and Implementation of a Three Degree of Freedom Force Output Joystick," MIT Libraries Archives Aug. 14, 1990, pp. 1-131, May 1990.

Russo, "Controlling Dissipative Magnetic Particle Brakes in Force Reflective Devices," DSC-vol. 42, Advances in Robotics, pp. 63-70, ASME 1992.

Scannell, "Taking a Joystick Ride," Computer Currents, Boston Edition, vol. 9, No. 11, Nov. 1994.

Shimoga, "Finger Force and Touch Feedback Issues in Dexterous Telemanipulation," Proceedings of Fourth Annual Conference on Intelligent Robotic Systems for Space Exploration, Rensselaer Polytechnic Institute, Sep. 30-Oct. 1, 1992.

Snow et al., "Model-X Force-Reflecting-Hand-Controller," NT Control No. MPO-17851; JPL Case No. 5348, pp. 1-4, Jun. 15, 1989.

Stanley et al., "Computer Simulation of Interacting Dynamic Mechanical Systems Using Distributed Memory Parallel Processors," DSC-vol. 42, Advances in Robotics, pp. 55-61, ASME 1992.

Tadros, "Control System Design for a Three Degree of Freedom Virtual Environment Simulator Using Motor/Brake Pair Actuators", MIT Archive © Massachusetts Institute of Technology, pp. 1-88, Feb. 1990.

Terry et al., "Tactile Feedback In A Computer Mouse," Proceedings of Fourteenth Annual Northeast Bioengineering Conference, University of New Hampshire, Mar. 10-11, 1988.

"Multimodal Interaction Demo: Trackball with Contextual Motor Feedback," web page at http://www.tm.tue.nl/jfschouten/research/demos/forcefeedbacktrackball.htm, as available via the internet and printed on Mar. 8, 2004.

PCT Search Report corresponding to PCT/US04/017563 mailed on Nov. 5, 2004.

* cited by examiner

SYSTEMS AND METHODS FOR PROVIDING A HAPTIC MANIPULANDUM

RELATED APPLICATIONS

This application claims priority to, and incorporates by reference hereto, U.S. Provisional Patent Application Ser. No. 60/475,809, filed Jun. 3, 2003, and entitled "Haptic Trackball."

FIELD OF THE INVENTION

The present invention generally relates to providing haptic feedback. The present invention more particularly relates to systems and methods for providing a haptic manipulandum, such as a trackball apparatus.

BACKGROUND

Electronic device manufacturers strive to produce a rich interface for users. Conventional devices utilize visual and auditory cues to provide feedback to a user. In some interface devices, kinesthetic and/or vibrotactile feedback (such as, without limitation, active and resistive force feedback, vibration, texture, heat, etc.) may also be provided to the user, more generally known collectively as "haptic feedback." Haptic feedback can provide cues that enhance and simplify the user interface.

Known systems and methods have attempted to provide haptic effects to a trackball device. (See, for example, U.S. Pat. No. 5,781,172, entitled "Data Input Device for Use With a Data Processing Apparatus and a Data Processing Apparatus Provided With Such a Device" by F. Engel et al.; U.S. Pat. No. 5,914,705, entitled "Apparatus and Method for Providing Detent-Like Tactile Feedback" by B. Johnson et al.; and U.S. Pat. No. 6,480,185, entitled "Electronic Device With Trackball User Input" by H. Kiljander et al.) Such systems and methods are not effective for certain design criteria and approaches.

SUMMARY

Embodiments of the present invention comprise systems and methods for providing a haptic manipulandum. One embodiment of the present invention comprises a housing, a substantially-spherical manipulandum, and a lever arm pivotably coupled to the housing. The lever arm may be configured to apply a processor-controlled force to the substantially-spherical manipulandum to provide a haptic effect. The resulting force may cause a resistance, which can be controlled to deliver haptic effects to a substantially-spherical manipulandum, such as a trackball.

This exemplary embodiment is mentioned not to limit or define the invention, but to provide an example of an embodiment of the invention to aid understanding thereof. Exemplary embodiments are discussed in the Detailed Description, and further description of the invention is provided there. Advantages offered by the various embodiments of the present invention may be further understood by examining this specification.

BRIEF DESCRIPTION OF THE FIGURES

These and other features, aspects, and advantages of the present invention are better understood when the following Detailed Description is read with reference to the accompanying drawings, wherein.

DETAILED DESCRIPTION

Embodiments of the present invention provide systems and methods for providing a haptic manipulandum. A device may incorporate a variety of technologies for providing haptic feedback, including both active and resistive devices. Active haptic feedback devices, including, for example, devices incorporating motors, generally add energy to a system; resistive devices, such as devices incorporating brakes, generally remove energy from the system.

Active haptic actuators may utilize, for example, alternating current (AC) or direct current (DC) electric motors and/or generators. Resistive haptic actuators may utilize, for example, electromagnetic brakes, magnetic particle brakes, magnetorheologic or electrorheologic brakes, or magnetic (non-friction) brakes. Electromagnetic brakes utilize a magnetic core, a coil, and a magnetic target. When a current is applied to the coil, the magnetic core acts upon the magnetic target. Magnetic particle brakes utilize a powder comprising particles of a magnetic material. When a current is applied, the particles line up and cause the powder to expand. Rheologic fluid brakes utilize a fluid that changes viscosity when a current is applied. A magnetic brake generates a magnetic field, and when a piece of metal passes through the magnetic field, an anti-current is generated, causing a resistance to movement of the metal.

Figure 1:
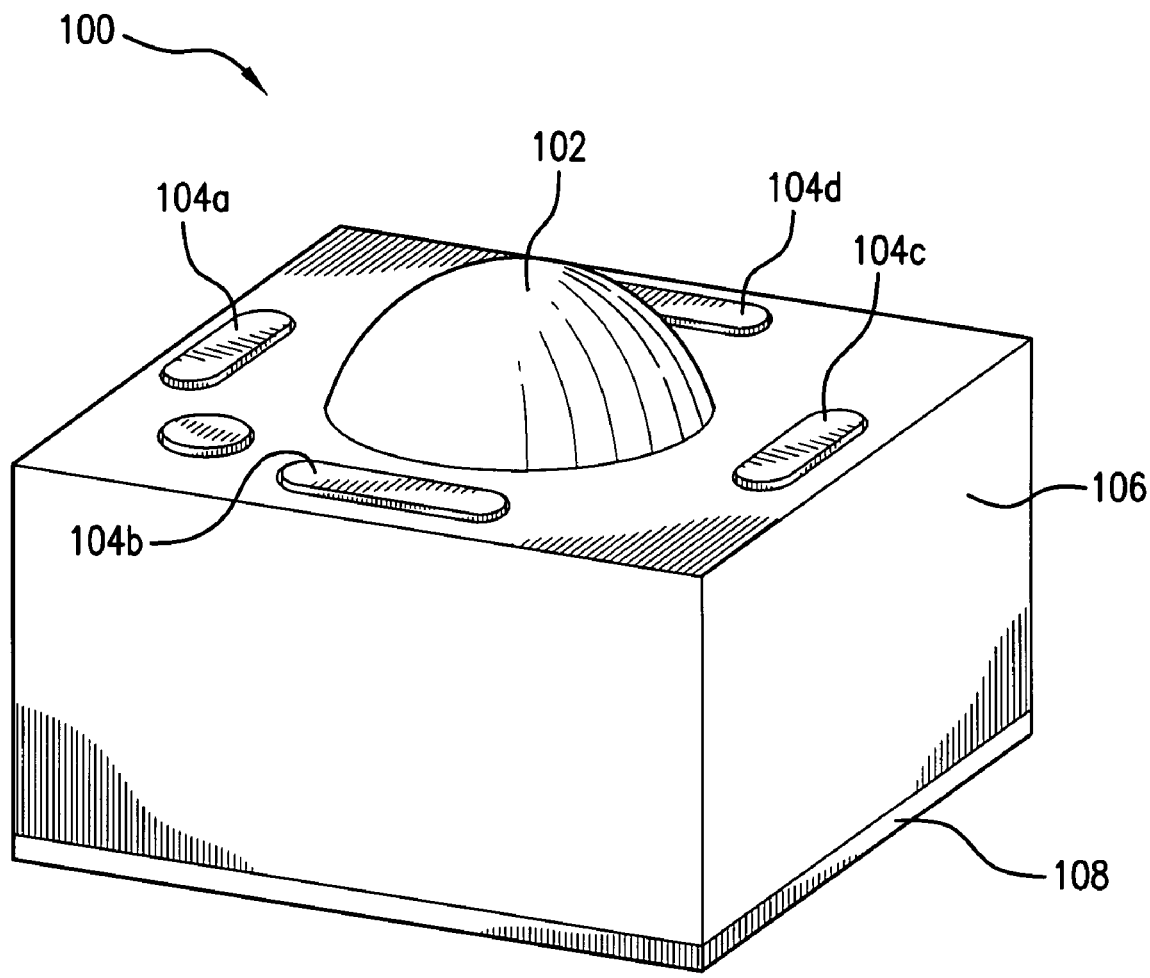
FIG. 1 illustrates a perspective view of a trackball device incorporating one embodiment of the present invention.

Referring now to the drawings in which like numerals indicate like elements throughout the several figures, FIG. 1 illustrates a manipulandum in the form of a device 100 incorporating one embodiment of the present invention. Trackball devices, such as trackball user input devices, may provide a user with the ability to roll a substantially-spherical manipulandum to guide an indicator (such as a cursor) on a user interface device (such as a computer monitor). The device 100 may comprise, for example, a pointing device configured to be used in communication with a device comprising a processor (such as a personal computer). In other embodiments, the device 100 may be integrated into a device comprising a processor (such as a laptop computer, an electronic book reader, a PDA, a mobile telephone, or any such suitable device).

The device 100 shown comprises a substantially-spherical manipulandum 102 that can be formed of plastic by injection molding. In other embodiments, the substantially-spherical manipulandum 102 may be formed of a different material (such as a metal), and/or may be formed by a different process (for example, by CNC-machining or die-casting). The substantially-spherical manipulandum 102 may be used to control the movement of an indicator (such as a cursor, an arrow, a highlighted field, etc.) on a user interface (such as a CRT, an LCD, a plasma screen, or a projector).

The device 100 shown further comprises four button manipulandum 104a-d. The button manipulandum 104a-d may each be configured to provide a different signal to a processor in communication with the device 100. For example, in one embodiment, button manipulandum 104a may be configured to provide a user of the device 100 with a one-step means of returning to his or her browser's preprogrammed homepage, while manipulandum 104b may be configured to provide the user with a one-step means of navigating to a web search engine page, and manipulandum 104c may be configured to allow the user to select an item that he or she has hovered over with an indicator on a user interface device. In other embodiments, the device 100 may comprise greater or fewer button manipulandum 104a-d, may comprise no additional manipulandum beyond the substantially-spherical manipulandum 102, or may comprise a plurality of substantially-spherical manipulanda.

The device 100 shown in FIG. 1 further comprises an upper housing portion 106 and a housing base 108 that together form a housing for the device 100. Some or all of the elements of the embodiment shown in FIGS. 1-4 may be housed in a housing. In other embodiments, the device 100 may be assembled without such a housing, or the housing may house greater or fewer of the device's elements. The upper housing portion 106 and the housing base 108 may be fashioned from a wide variety of suitable materials, and may be fashioned from the same or different materials. For example, in one embodiment, the upper housing portion 106 and the housing base 108 may both be fashioned from a non-magnetic material, such as a plastic, to avoid interference with operation of an electromagnetic or a magnetic resistive actuator housed within the housing. In other embodiments, the upper housing portion 106 and/or the housing base 108 may be fashioned from other materials, such as a magnetic material.

The housing base 108 may be fixably fastened to a surface or otherwise mechanically grounded using any conventional method of fastening, such as by using adhesives, screws, or collet-pins. The housing base 108 shown is configured to secure and prevent movement of the upper housing portion 106 with respect to the housing base 108, and to restrict the movement of the substantially-spherical manipulandum 102. The upper housing portion 106 shown is configured to expose approximately 37% of the surface area of the substantially-spherical manipulandum 102, and to keep the substantially-spherical manipulandum 102 from escaping the housing while still permitting enough surface area of the substantially-spherical manipulandum 102 for a user of the device 100 to roll and rotate the substantially-spherical manipulandum 102. In other embodiments, the upper housing portion 106 may expose a greater or a lesser percentage of the substantially-spherical manipulandum's 102 surface area.

Figure 2:
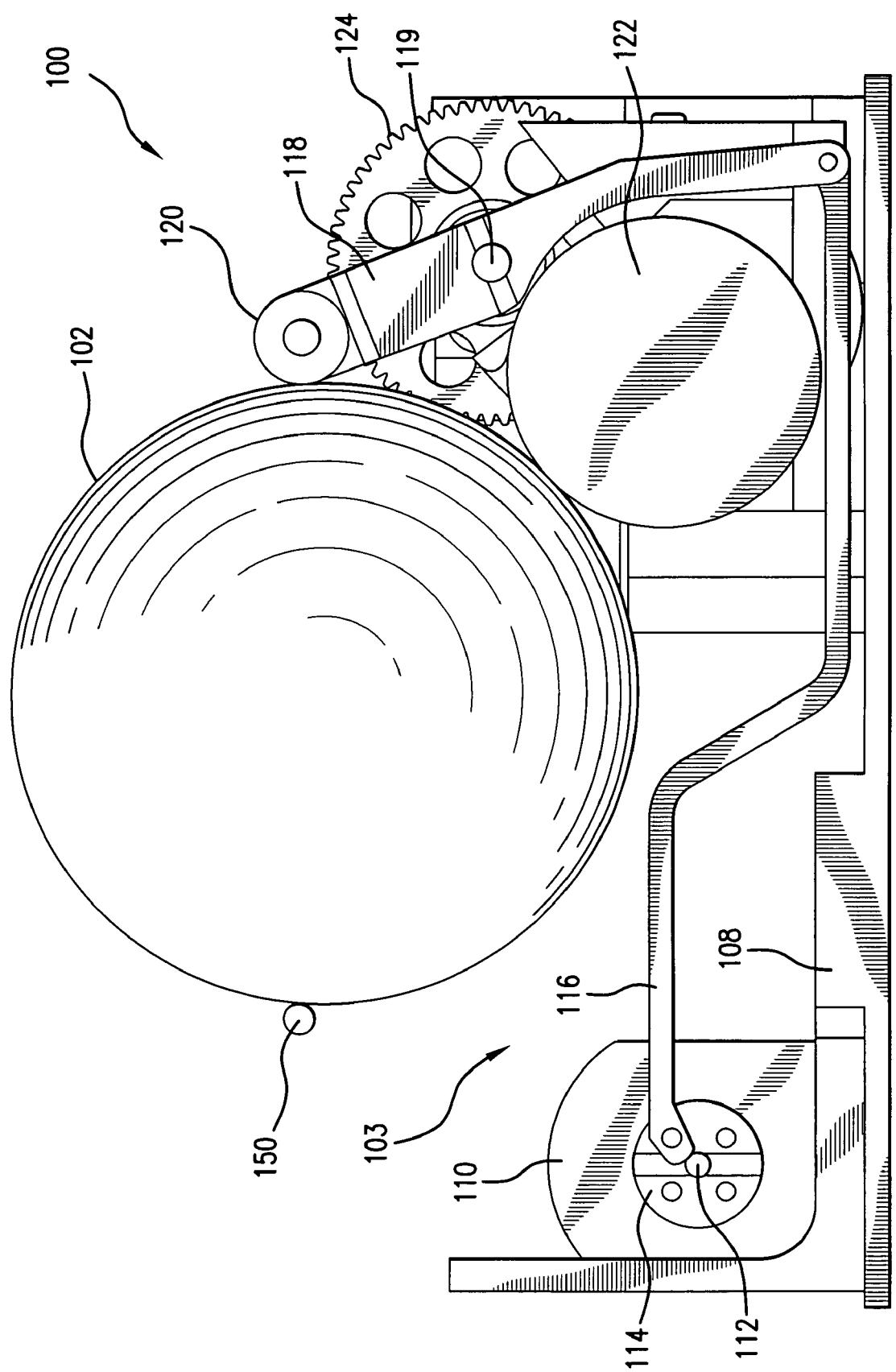
FIG. 2 is a cutaway elevation view of a sub-assembly comprising a first actuator and a second actuator according to the embodiment shown in FIG. 1.
Figure 4:
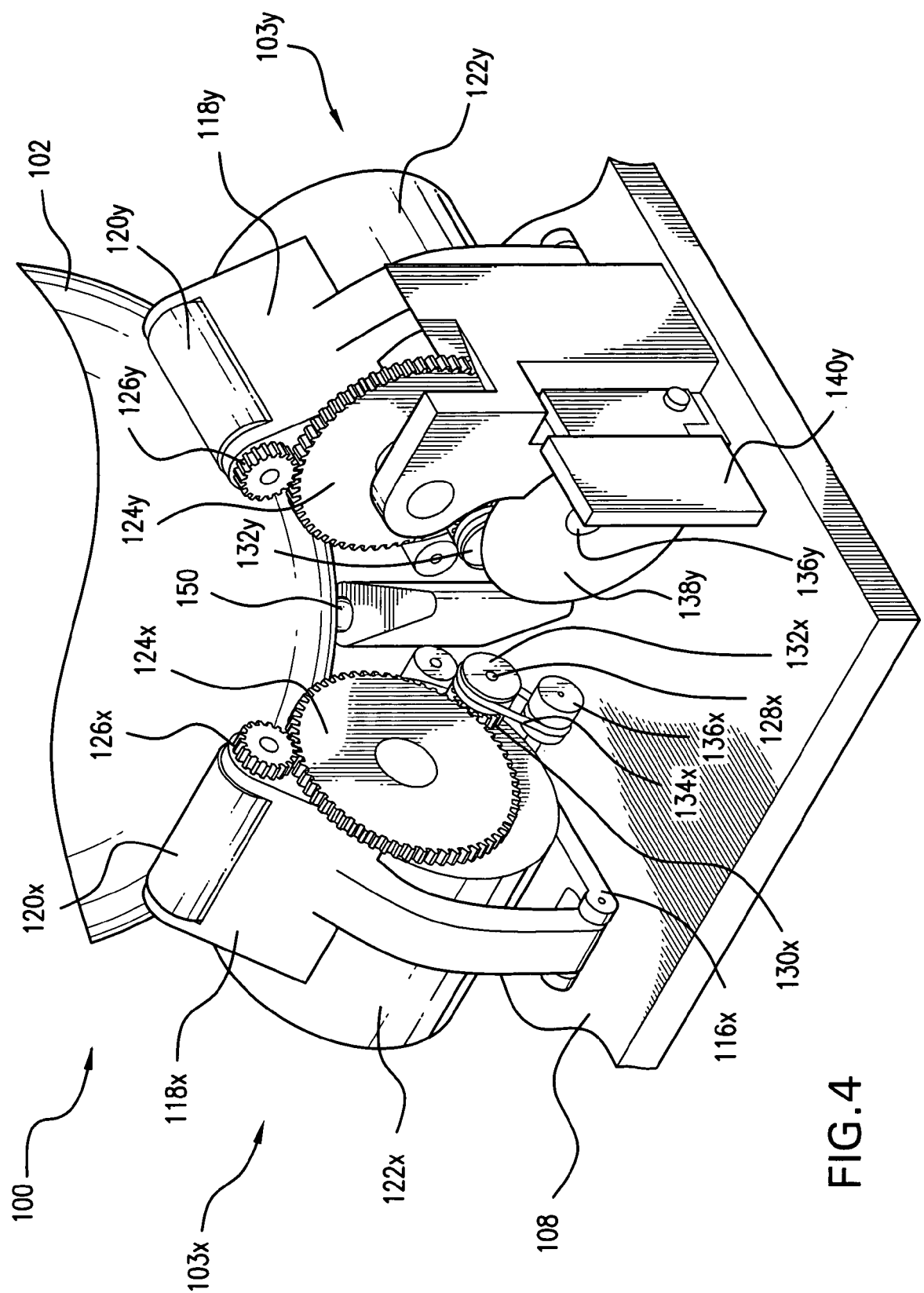
FIG. 4 is a cutaway perspective view of a trackball device comprising a sensing device according to an embodiment of the present invention.

The housing base 108 shown is configured to receive a plurality of jewel bearings (examples of the jewel bearings are shown in FIGS. 2 and 4). The jewel bearings may be configured to substantially hold the substantially-spherical manipulandum 102 in place, while simultaneously providing a surface on which the substantially-spherical manipulandum 102 may rotate, pivot, and/or swivel with relatively low friction. The jewel bearings may comprise, for example, fixed steel ball bearings, and may be configured to contact and position the substantially-spherical manipulandum 102 while providing minimal friction when the substantially-spherical manipulandum 102 is moved. In other embodiments, the substantially-spherical manipulandum 102 may be held in place and/or supported by a different suitable means, such as by the use of ball bearings configured to roll when a user of the device 100 rolls the substantially-spherical manipulandum 102.

Referring now to FIG. 2, a cutaway elevation view of a sub-assembly 103 of the device 100 is shown, according to an embodiment of the present invention. The sub-assembly 103 comprises a first actuator 110 and a second actuator 122, both in communication with the manipulandum 102 according to the embodiment shown in FIG. 1 is shown. In the embodiment shown in FIG. 2, a sub-assembly 103 of the device 100 is shown with the upper housing portion 106 that is shown in FIG. 1 removed. The substantially-spherical manipulandum 102 shown may comprise, for example, an injection-molded plastic trackball. The substantially-spherical manipulandum 102 is in contact with a jewel bearing 150. The jewel bearing 150 shown is configured to position the substantially-spherical manipulandum 102 while providing a substantially-low friction interface between the two elements. In other embodiments, a plurality of jewel bearings may be used to position and/or support the substantially-spherical manipulandum 102 while providing an ease of manipulability to the substantially-spherical manipulandum 102.

In the embodiment shown in FIG. 2, both the first actuator 110 and the second actuator 122 shown comprise DC electric motors in communication with a processor device, and are both mechanically-grounded to the housing base 108. In other embodiments, the first and/or the second actuator may comprise other types of active actuators, and/or resistive actuators, such as brakes. For example, in one embodiment, the actuator 122 may comprise an electromagnetic, magnetic particle, magnetorheologic, electrorheologic, magnetic, or piezo-electric brake. In yet another embodiment, the sub-assembly 103 may comprise only a single actuator. For example, in one such embodiment, the sub-assembly 103 may comprise only the first actuator 110 configured to pivotably apply a processor-controlled force to the substantially-spherical manipulandum 102 with a brake pad contacting surface. In one such embodiment, pivotably applying the processor-controlled force may comprise pivotably applying a processor-controlled force substantially-normal to a surface of the substantially-spherical manipulandum 102.

Embodiments of the present invention may utilize various other active and/or resistive actuators as well. For example, in one embodiment, an active actuator may provide resistive effects. In such an embodiment, a motor in communication with a manipulandum may be short-circuited or set up to act as a generator, causing a resistance. In an embodiment in which a motor is set up as a generator, the motor can generate current back to a power supply during certain braking effects and during damping effects.

Other embodiments of the present invention may utilize a piezo-electric actuator. In a piezo-electric actuator, a voltage may be applied to a piezo-ceramic, causing the crystals to elongate and thereby changing the shape of the material. A material shape change of a piezo-ceramic may be relatively small and some type of amplification may be utilized to provide a mechanical force.

One embodiment of the present invention may comprise a controller (not shown), such as a processor, that may control the application of current generated by a power supply (not shown) to the first and/or second actuators 110, 122 shown in FIG. 2. In this way, the processor may control the application of forces to the substantially-spherical manipulandum 102. Processors can comprise, for example, digital logical processors capable of processing input, executing algorithms, and generating output as necessary to create the desired tactile sensations in the input device in response to an input received from an input device. Such controllers may comprise a microprocessor, an Application Specific Integrated Circuit (ASIC), and state machines.

Such processors may comprise, or may be in communication with, media, for example computer readable media, that may store instructions that, when executed by the processor, can cause the processor to perform the steps described herein as carried out, or assisted, by a processor. Embodiments of computer-readable media may comprise, but are not limited to, an electronic, optical, magnetic, or other storage or transmission device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other forms of computer-readable media may transmit or carry instructions to a computer, such as a router, private or public network, or other transmission device or channel. The processor, and the processing, described may be in one or more structures, and may be dispersed through one or more structures.

A controller according to the present invention may be capable of controlling the application of a wide variety of forces to the substantially-spherical manipulandum 102, thereby generating a corresponding variety of haptic effects. For example, a controller may create effects, such as detents, between entries in a spreadsheet database application. The controller may create additional effects as well, comprising, for example, bumps, vibrations and stops by applying various currents to the first and/or second actuators 110, 122. In one embodiment, such a processor may be able to apply to the substantially-spherical manipulandum 102 a large processor-controlled force generated by a first sub-assembly 103x (shown in FIG. 3), while simultaneously applying no forces to the substantially-spherical manipulandum 102 with a second sub-assembly 103y (also shown in FIG. 3).

Referring still to FIG. 2, the first actuator 110 shown is configured to generate a first processor-controlled force that may be applied to the substantially-spherical manipulandum 102. The first actuator 110 comprises a drive shaft 112 in direct communication with the center of a crank 114. When the first actuator 110 turns the drive shaft 112, the crank 114 turns with the drive shaft 112. The opposing end of the crank 114 is in communication with a link 116 near the circumference of the crank 114. The link 116 shown is fashioned from a plastic by injection molding. As shown in FIG. 2, the link 116 is configured to avoid mechanical interference with the second actuator 122 and the substantially-spherical manipulandum 102.

The opposing end of the link 116 is in rotatable communication with a lever arm 118. The lever arm 118 is fashioned from a plastic by injection molding. In other embodiments, the lever arm 118 may be fashioned from other materials (such as a metal or a wood), and/or by using a different means of fabrication (such as CNC machining, forging, or die casting). The lever arm 118 is configured to pivot about a fulcrum 119. The lever arm 118 is pivotably coupled to the housing base 108 at the fulcrum 119. The lever arm 118 is configured to apply the processor-controlled force generated by the first actuator 110 to the substantially-spherical manipulandum 102 to provide a haptic effect to the user of the device 100.

The opposing end of the lever arm 118 is rotatably coupled to roller 120. The roller 120 comprises a contacting surface, and is configured to contact the substantially-spherical manipulandum 102. In the embodiment shown, the portion of the roller 120 that contacts the substantially-spherical manipulandum 102 comprises neoprene. In other embodiments, at least a portion of the roller 120 may be fashioned from other materials (such as, for example, from a plastic, a rubber, a metal, or a wood). In the embodiment shown in FIG. 2, the lever arm 118 is configured to apply the first processor-controlled force to the substantially-spherical manipulandum 102 via the roller 120. In the embodiment shown, the first actuator 110 is further configured to pivotably adjust the amount of force applied to the roller 120. Similarly, the first actuator 110 may be configured to remove the roller 120 from contact with the surface of the substantially-spherical manipulandum 102 by driving the crank shaft 112 counterclockwise as viewed in FIG. 2, thereby pivoting the lever arm 118 away from the substantially-spherical manipulandum 102.

The second actuator 122 shown in FIG. 2 is configured to generate a second processor-controlled force. The second processor-controlled force generated by the second actuator 122 may comprise a first component normal to the surface of the substantially-spherical manipulandum 102, and a second component tangential to the surface of the substantially-spherical manipulandum 102. For example, in one embodiment, the second processor-controlled force may be directed substantially tangential to the surface of the substantially-spherical manipulandum 102. The second processor-controlled force generated by the second actuator 122 may be transmitted to the roller 120 in the embodiment shown via a transmitting gear 124. In other embodiments that comprise a second actuator configured to generate a second processor-controlled force, the generated force may be directly transmitted by the second actuator to a contacting surface. For example, in one such embodiment, the second actuator 124 may comprise a drive shaft that may be coupled directly to the roller 120.

The roller 120 shown in FIG. 2 is configured to apply the second processor-controlled force to the surface of the substantially-spherical manipulandum 102. For example, the second processor-controlled force applied to the substantially-spherical manipulandum 102 in the embodiment shown in FIG. 2 may be applied to the surface of the substantially-spherical manipulandum 102 in a direction substantially perpendicular to the housing base 108. For example, if the roller 120 is turned clockwise as viewed in FIG. 2, the roller 120 may apply a second processor-controlled force substantially perpendicular to the base of the housing base 108, in a generally upward direction. If no other force is presently acting on the substantially-spherical manipulandum 102, the substantially-spherical manipulandum 102 may be turned counter-clockwise (as viewed in FIG. 2) in response to the second processor-controlled force applied by the roller 120. If a user attempts to turn the substantially-spherical manipulandum 102 clockwise while the roller 120 is applying this example second processor-controlled force, the user will encounter a resistance to the attempted movement.

In one embodiment, the second processor-controlled force applied to the substantially-spherical manipulandum 102 may be associated with the pivotably-applied, first processor-controlled force applied to the substantially-spherical manipulandum 102. For example, for a substantially similar amount of force generated by the second actuator 122, the second processor-controlled force applied to the substantially-spherical manipulandum 102 may increase as a substantially-normal, first processor-controlled force pivotably applied to the substantially-spherical manipulandum 102 increases. The substantially-normal, first processor-controlled force may comprise a force generated by the first actuator 110, and directed substantially normal to and towards the surface of the substantially-spherical manipulandum 102. An increase in a tangential component of the second processor-controlled force applied to the substantially-spherical manipulandum 102 for a substantially similar amount of force generated by the second actuator 122 may result from the increase in a friction force in substantially the same direction as the tangential component of the second processor-controlled force applied by the roller 120. The increase in the friction force is a product of the coefficient of friction and the amount of substantially-normal, first processor-controlled force pivotably applied by the roller 120. Similarly, if the first actuator 110 operates to pivot the roller 120 away from contact with the substantially-spherical manipulandum 102, the second processor-controlled force generated by the second actuator 122 may not be applied to the substantially-spherical manipulandum, as there may be no friction force between the roller 120 and the substantially-spherical manipulandum 102.

Contact between the roller 120 and the substantially-spherical manipulandum 102 may cause a resistance to movement of the substantially-spherical manipulandum 102. For example, a second processor-controlled force directed substantially perpendicular to and toward the base of the housing base 108 cause a resistance to a counter-clockwise rotation of the substantially-spherical manipulandum 102 as viewed in FIG. 2. If the substantially-spherical manipulandum 102 is turning counter-clockwise at the time of such contact, the resistance may cause the substantially-spherical manipulandum 102 to stop turning. In one embodiment, the resistance to the movement may be low enough such that the user can overcome the resistance. When the first and/or second actuators 110, 122 receive a pulsed current, a haptic effect in the form of a vibration, step, and/or bump may be created.

Figure 3:
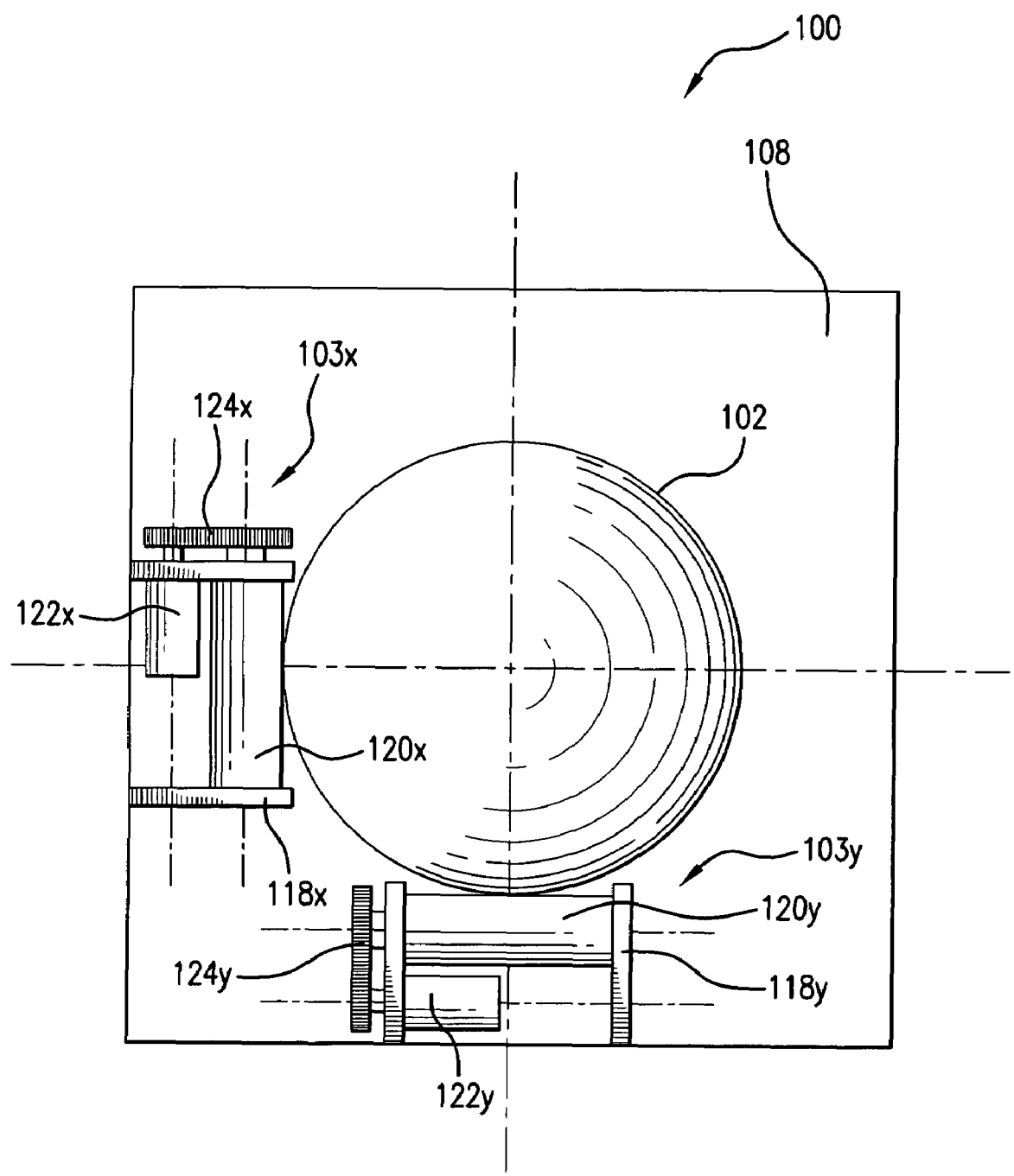
FIG. 3 is a plan view of a trackball device according to the embodiment of the present invention shown in FIG. 1.

Referring now to FIG. 3, a plan view of the device 100 is shown illustrating an example layout of a device comprising a plurality of sub-assemblies 103x, 103y, both in communication with the substantially-spherical manipulandum 102. The first and second sub-assemblies 103x, 103y are both pivotably coupled to the housing base 108 shown. The first sub-assembly 103x shown is configured to provide haptic effects to an X-axis of the device 100, while the second sub-assembly 103y is configured to provide haptic effects to a Y-axis of the device 100, where the Y-axis is substantially orthogonal to the X-axis. The sub-assemblies 103x, 103y shown do not illustrate every element shown in sub-assembly 103 of FIG. 2, but have been simplified to aid in illustration of their example layout in this embodiment. In other embodiments, the device 100 may comprise greater or fewer numbers of sub-assemblies, and a device comprising a plurality of such sub-assemblies may have the sub-assemblies arranged in such a fashion that they are substantially not orthogonal to one another.

The sub-assemblies 103x, 103y shown each comprise a lever arm 118x, 118y, a roller 120x, 120y, a second actuator 122x, 122y, a transmitting gear 124x, 124y. The sub-assemblies 103x, 103y shown further comprise the other elements shown with respect to FIG. 2. The sub-assemblies 103x, 103y may act separately or in synchronization to provide a haptic effect to the substantially-spherical manipulandum 102.

The orthogonal relationship between sub-assemblies 103x, 103y shown in FIG. 3 may provide the user with a variety of haptic effects that may be implemented with respect to a two-dimensional user interface device. For example, a television remote control employing a trackball device comprising the orthogonal arrangement of sub-assemblies 103x, 103y shown in FIG. 3 may be able to provide haptic effects to the user of the device 100 that correspond to the location of images of objects on a two-dimensional graphical user interface device (such as a plasma screen television).

Referring now to FIG. 4, a close-up perspective view of an embodiment of the present invention comprising a sensing device 136y is shown. The device 100 shown comprises the two sub-assemblies 103x, 103y shown in FIG. 3. The sub-assembly 103x comprises a link 116x rotatably coupled to the lever arm 118x, which is pivotably coupled to the housing base 108. The sub-assembly 103x further comprises the second actuator 122x. The second actuator 122x shown comprises a drive shaft 128x. The second actuator 122x is configured to drive the drive shaft 128x. The drive shaft 128x is fixably coupled to both a drive gear 130x, and a drive pulley 132x. The drive shaft 128x is configured to simultaneously drive the drive gear 130x and the drive pulley 132x. The drive gear 130x is configured to drive the transmission gear 124x, which his configured to drive a roller gear 126x in communication with a roller 120x contacting surface.

The drive pulley 132x is in communication with a drive belt 134x. The drive belt 134x is also in communication with an encoder drive 136x. The drive pulley 132x is configured to drive the encoder drive 136x. The encoder drive 136x is configured to receive an encoder disk, such as the encoder disk 138y shown with respect to sub-assembly 103y in FIG. 4. Sub-assembly 103y comprises analogous elements to those of sub-assembly 103x, some of which are hidden from view by the encoder disk 138y. For example, as shown by FIG. 4, sub-assembly 103y comprises a transmission gear 124y in communication with a drive gear (not shown) that is in communication with a drive shaft (not shown) of the second actuator 122y (as shown in FIG. 3). The sub-assembly 103y further comprises a roller gear 126y in communication with the transmission gear 124y, a roller 120y in communication with the roller gear 126y and the substantially-spherical manipulandum 102, a lever arm 118y, and a drive pulley 132y in communication with an encoder drive 136y.

The encoder disk 138y is fixably coupled to the encoder drive 136y, and is configured be driven by the second actuator 122y (shown in FIG. 3). The encoder disk 138y may comprise coding (not shown) from which a sensing device 140y may sense the movement of the encoder disk 138y with respect to the sensing device 140y. As such, the sensing device 140y is in direct communication with the second actuator 122y, and roller 120y, and in indirect communication with the substantially-spherical manipulandum 102 via the roller 120y.

The coding on the encoder disk 138y may comprise, for example, a series of light and dark markings capable of being distinguished by an optical sensor. In other embodiments, the coding may comprise other types and configurations, such as one or more symbols, markings, etchings, holes, depressions, material additions, magnetized strips, or any other type of identifier that may help convey the relative movement or location of the encoder disk 138y with respect to the sensing device 140y, and/or the relative movement or location of the roller 120y, the actuator 122y, or the substantially-spherical manipulandum 102 with respect to the sensing device 140y and/or with respect to one another.

The coding may be provided using a variety of different processes, for example, the coding may be deposited on, drawn on, ground into, melted into, or affixed to the encoder disk 138y. In another embodiment, the roller 120y, and/or the substantially-spherical manipulandum 102 may comprise the coding, and the sensing device 140y may be alternately configured to sense coding on an element of sub-assembly 103y other than encoder disk 138y. In yet another embodiment, a single sensing device may be configured to simultaneously sense a movement of at least one element of both assemblies 103x, 103y.

The sensing device 140y shown in FIG. 4 comprises a sensor configured to sense the coding of the encoder disk 138y. The sensing device 140y is thusly configured to sense a movement of the encoder disk 138y with respect to the sensing device 140y. The sensor may comprise, for example, an optical sensor capable of sensing light and dark markings, such as a series of markings that comprise an example coding. In other embodiments that comprise a sensing device, the sensing device 140y may comprise a sensor configured to sense a different type of coding, such as magnetic information, an etching, a material addition, etc. In another embodiment, the sensing device 140y may be capable of sensing, for example, a relative movement between the substantially-spherical manipulandum 102 and the roller 120y, and/or the relative movement between the substantially-spherical manipulandum 102 or the roller 120y and the sensing device 140y.

The sensing device 140y may communicate to a processor device in communication with at least one of the first and second assemblies 103x, 103y the relative movement between the encoder disk 138y and the sensing device 140y in a sensor output signal. From the sensor output signal, the processor device may be able to ascertain a movement of or the position of the substantially-spherical manipulandum 102. The processor device may be in communication with an I/O port connected to a power supply (not shown). In response to receiving the sensor output signal from the sensing device 140y, the processor device may send a feedback control signal in the form of an electrical current generated by a power supply (such as a battery, an alternating current, or a direct current) to the first and/or second actuators 110y, 122y of the sub-assembly 103y, and/or the first and/or second actuators 110x, 122x of the first sub-assembly 103x to create a desired haptic effect.

Referring still to FIG. 4, a jewel bearing 150 is shown supporting the substantially-spherical manipulandum 102. The jewel bearing 150 shown is configured to support the substantially-spherical manipulandum 102 while providing a substantially-low friction interface between the two elements. In other embodiments, a plurality of jewel bearings may be used to support and/or position the substantially-spherical manipulandum 102 while providing an ease of manipulability to the substantially-spherical manipulandum 102.

Various methods, systems, and devices utilizing embodiments of the present invention may be employed. For example, in one embodiment, a device may comprise a housing, a substantially-spherical manipulandum, and a lever arm pivotably coupled to the housing. The substantially-spherical manipulandum may comprise a trackball, such as an injection-molded plastic sphere commonly used in trackball pointing devices. A user of the device may use the substantially-spherical manipulandum to communicate with the device. For instance, the user may scroll through a list of contacts on a PDA device using a trackball manipulandum by rolling the trackball. The lever arm may be configured to apply a processor-controlled force to the substantially-spherical manipulandum to provide a haptic effect. For example, in one embodiment, a first actuator in communication with the lever arm may be configured to generate the processor-controlled force. The processor-controlled force may comprise a substantially-normal, processor-controlled force (such as a force directed substantially-normal to a surface of the substantially-spherical manipulandum). Such a device may be capable of producing a wide variety of haptic effects, comprising bumps, stops, and vibrations.

In one embodiment, the haptic effect provided may comprise a predetermined haptic effect. The haptic effect provided may comprise, for example, a predetermined haptic effect, and a processor may determine the haptic effect provided by using a look-up table of haptic effects. In another embodiment where the haptic effect provided comprises a predetermined haptic effect, a processor may receive an input signal, and use an algorithm to determine which haptic effect to provide in response.

A contacting surface, such as a brake pad or a roller, may be coupled to the lever arm in communication with the substantially-spherical manipulandum. For example, in one embodiment, a roller comprising a neoprene contacting surface configured to contact a plastic substantially-spherical manipulandum may be rotatably coupled to the lever arm. The roller in such an embodiment may be configured to apply a second processor-controlled force to the substantially-spherical manipulandum. The second processor-controlled force may comprise a first component directed normal to a surface of the substantially-spherical manipulandum and a second component directed tangential to the surface of the substantially-spherical manipulandum. For example, in one embodiment, the second processor-controlled force may comprise a force directed substantially tangential to the surface of the substantially-spherical manipulandum. The second processor-controlled force may be associated with the first processor-controlled force generated by the first actuator in communication with the lever arm. A second actuator in communication with the roller may be configured to generate the second processor-controlled force. In one embodiment employing a roller, the lever arm may be configured to apply the first processor-controlled force to the substantially-spherical manipulandum via the roller.

The contacting surface may comprise a material having a coefficient of friction such that when the contacting surface is brought into contact with a substantially-spherical manipulandum with a first processor-controlled force applied by a first actuator, the first processor-controlled force, and/or a second processor-controlled force provided by a second actuator may slow or stop movement between the contacting surface and the substantially-spherical manipulandum. In one embodiment, an interface disposed between a roller contacting surface and the substantially-spherical manipulandum may comprise a predetermined static and/or kinetic coefficient of friction. In such an embodiment, the second processor-controlled force may be associated with the predetermined coefficient of friction. For example, in one embodiment, the second processor-controlled force may vary, at least in part, with the predetermined coefficient of friction.

The haptic effect provided to the user of the trackball device may vary according to the second processor-controlled force. For example, as the second processor-controlled force increases, resistance to a movement of the substantially-spherical manipulandum 102 in a direction opposing the second processor-controlled force may increase, alerting the user to the presence of an obstacle (such as an object, a file, a screen boundary, etc.).

In one embodiment, the second processor-controlled force may be associated with the first processor-controlled force. For example, in one embodiment, the first actuator configured to generate the first processor-controlled force may be slaved to the second actuator configured to generate the second processor-controlled force. In one such embodiment, when the second actuator is actuated by a processor and generates the second processor-controlled force, the slaved first actuator may generate a predetermined first processor-controlled force associated with the particular second processor-controlled force generated by the second actuator. In one such embodiment, the first actuator may be in direct or indirect communication with the processor device, and may be actuated only when the second actuator is actuated. In one such embodiment, the first processor-controlled force may be controlled directly or indirectly by the processor via the second actuator.

Another apparatus according to the present invention may comprise a first actuator configured to pivotably provide a processor-controlled force to a contacting surface (such as a roller) in communication with a substantially-spherical manipulandum (such as a trackball) to provide a haptic effect. For example, in one such embodiment, the first actuator may be mechanically grounded to a housing base, with a drive shaft extending substantially perpendicular to, and away from, the housing base. In such an embodiment, a crank may be coupled to the first actuator's drive shaft, and the contacting surface (such as a roller) may be coupled to the crank. In such an embodiment, the first actuator may be configured to pivot the crank, and the contacting surface thereon toward and away from the substantially-spherical manipulandum along a path substantially parallel to the housing base. A second actuator in communication with the contacting surface may also be coupled to the crank, and may be configured to provide a second processor-controlled force to the substantially-spherical manipulandum.

In one embodiment, the processor-controlled force provided by the first actuator may comprise, for example, a substantially-normal, processor-controlled force. In one such embodiment, the contacting surface may be configured to communicate the processor-controlled. force to the substantially-spherical manipulandum. One such embodiment may further comprise a second actuator. The second actuator may be configured to provide a second processor-controlled force to the contacting surface. The second processor-controlled force may be associated with the first processor-controlled force provided by the first actuator.

In one embodiment, a lever may be disposed between the first actuator and the contacting surface. The lever may pivot about a mechanically-grounded fulcrum. In one such embodiment, the first actuator may be configured to pivotably provide the first processor-controlled force to the contacting surface via the lever. The lever may further be configured to provide pivotable communication between the contacting surface and the substantially-spherical manipulandum.

One embodiment of the present invention may further comprise a sensing device. The sensing device may be in communication with the substantially-spherical manipulandum, the lever arm, a contacting surface (such as a roller), a first actuator configured to generate the first processor-controlled force, and/or a second actuator configured to generate the second processor-controlled force. Likewise, the sensing device may be configured to sense a movement of the substantially-spherical manipulandum, the lever arm, the roller, the first actuator, and/or the second actuator.

One such device may comprise a processor in communication with the sensing device and the first actuator and/or the second actuator. The processor may be configured to control the generation of the first processor-controlled force and/or the second processor-controlled force. The processor may be configured to provide haptic feedback. The processor may receive a sensor output signal from the sensing device. For instance, a sensor output signal may comprise information about the relative movement between the substantially-spherical manipulandum and the sensing device, the relative movement between the substantially-spherical manipulandum and the contacting surface, the relative movement between the contacting surface and the sensing device, and/or the position of the substantially-spherical manipulandum. The processor may send a feedback control signal to the first and/or second actuators in response to the sensor output signal. For instance, the feedback control signal may comprise an electrical current. The processor may be in communication with an I/O port and a power supply.

The present invention may also be embodied in various methods. For example, in one method according to the present invention, a first processor-controlled force may be pivotably applied to a substantially-spherical manipulandum (such as a trackball) to provide a haptic effect. In one embodiment, pivotably applying the first processor-controlled force to the substantially-spherical manipulandum may comprise pivotably applying a substantially-normal, processor-controlled force to a substantially-spherical manipulandum in a direction substantially normal to the surface of the substantially-spherical manipulandum. In another embodiment, pivotably applying the first processor-controlled force to the substantially-spherical manipulandum may comprise applying a pivoting force to a lever arm configured to apply the first processor-controlled force to the substantially-spherical manipulandum. The processor-controlled force may be generated in one embodiment with an active actuator (such as a DC motor), and/or with a passive actuator (such as an electromagnetic brake).

This method may further comprise applying a second processor-controlled force to the substantially-spherical manipulandum in a direction substantially tangential to the surface of the substantially-spherical manipulandum to provide an additional haptic effect, and/or enhance the haptic effect provided by the first processor-controlled force pivotably applied to the substantially spherical manipulandum. The second processor-controlled force applied to the substantially-spherical manipulandum may be associated with the pivotably applied first processor-controlled force. For example, in one embodiment, the second processor-controlled force may vary, at least in part, with the first processor-controlled force. In another embodiment, the first processor-controlled force may be slaved to the second processor-controlled force. In yet another embodiment, the second processor-controlled force applied to the substantially-spherical manipulandum may be associated with a force associated with the substantially-spherical manipulandum, such as the weight of the substantially-spherical manipulandum, or a force provided by the user of the substantially-spherical manipulandum.

The second processor-controlled force may be generated in one embodiment with an active actuator (such as a DC motor), and/or with a passive actuator (such as an electromagnetic brake). In one embodiment, applying the second processor-controlled force to the substantially-spherical manipulandum may comprise applying a second processor-controlled force to a roller rotatably coupled to a lever arm configured to apply the second processor-controlled force to the substantially-spherical manipulandum.

Another method according to the present invention may comprise pivotably applying a first processor-controlled force to a contacting surface (such as a roller) in communication with a substantially-spherical manipulandum to provide a haptic effect. In one such embodiment, pivotably applying the first processor-controlled force to the contacting surface may comprise applying a pivoting force to a lever in communication with the contacting surface.

One embodiment of this method may further comprise applying a second processor-controlled force to the contacting surface. The second processor-controlled force may comprise, for example, a first component normal to the surface of the substantially-spherical manipulandum and a second component tangential to the surface of the substantially-spherical manipulandum. In one such embodiment, the second processor-controlled force may be associated with the pivotably-applied, first processor-controlled force. For example, in one embodiment, the second processor-controlled force may vary, at least in part, with the first processor-controlled force. In another such embodiment, the second processor-controlled force may be associated with a force associated with the substantially-spherical manipulandum, such as the weight of the substantially-spherical manipulandum, or a force provided to the substantially-spherical manipulandum by a user of the substantially-spherical manipulandum. The first processor-controlled force may comprise, for example, a substantially-normal, processor-controlled force in one method according to the present invention.

In one method according to the present invention, a sensing device may sense a movement of a substantially-spherical manipulandum, a contacting surface, a lever arm, a roller, a first actuator, and/or a second actuator. In one such method, the first processor-controlled force and/or the second processor-controlled force may be varied in response to a movement sensed by the sensing device. An element of a device according to the present invention may comprise a coding. For example, in one embodiment, a roller contacting surface may comprise the coding. In another embodiment, the coding may be marked on an encoder disk in communication with an actuator. In one embodiment, a sensing device may sense a movement of the substantially-spherical manipulandum by sensing a coding etched on an exterior surface of the substantially-spherical manipulandum.

The coding may comprise information from which the sensing device may be capable of sensing the relative movement between the substantially-spherical manipulandum, the contacting surface, the first actuator, the second actuator, or the lever arm and the sensing device. The coding may additionally or alternatively comprise information from which the sensing device may be capable of sensing the position of the substantially-spherical manipulandum, the first actuator, and/or the second actuator. For example, in one embodiment, the coding may comprise a series of markings printed on the substantially-spherical manipulandum and visible to a sensing device. In another embodiment, a coding may comprise a series of light and dark markings affixed to a cylindrical roller contacting surface configured to rotatably communicate with the substantially-spherical manipulandum. The light and dark markings may each be unique, allowing the optical sensor to determine the degree of relative rotation of the contacting surface with respect to the stationary sensing device.

The sensing device may be configured to sense the coding. For instance, the sensing device may comprise an optical reader capable of sensing light and dark markings. The sensing device may be affixed to a stationary housing, and may have a substantially unobstructed line of sight to the coding. For instance, in one embodiment there may not be any physical obstructions between a sensing device comprising an optical sensor located in the sensing device and a portion of the coding of the substantially-spherical manipulandum.

Figure 5:
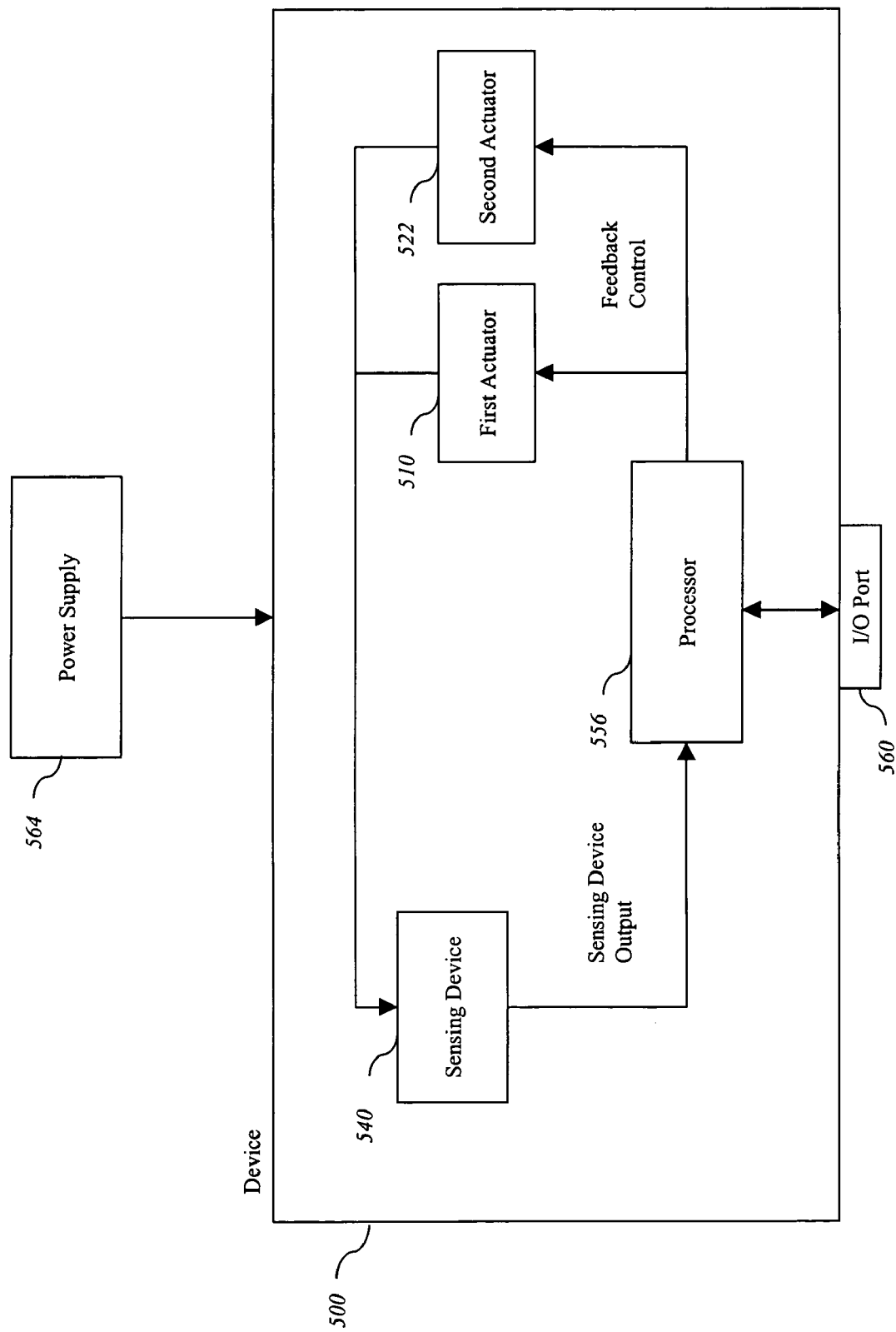
FIG. 5 is a block diagram, illustrating one embodiment of a trackball device according to the present invention.

Referring again to the figures, FIG. 5 is a block diagram, illustrating one embodiment of a device 500 according to the present invention. The device 500 may comprise, for example, a trackball pointing device. In the embodiment shown, the device 500 comprises a sensing device 540. The sensing device 540 may comprise one of the sensors discussed in relation to FIG. 4 or various other types of sensors.

The device 500 further comprises a first actuator 510 configured to generate a first processor-controlled force and a second actuator 522 configured to generate a second processor-controlled force. In one embodiment, the first and second actuators 510, 522 may comprise DC electric motors. In other embodiments, the first and/or second actuators 510, 522 may comprise other types of actuators, such as brakes and AC electric motors.

The sensing device 540 and the first and second actuators 510, 522 shown are all in communication with a processor 556. The processor 556 may receive sensor information in the form of a sensor output signal from the sensing device 540, may perform control algorithms, and may provide feedback control signals to the first and/or second actuators 510, 522.

The device shown in FIG. 5 further comprises an input/output (I/O) port 560, such as a game port, for performing bi-directional communication with external devices utilizing an embodiment of the present invention. In the embodiment shown, the device 500 receives power from an external power supply 564. In other embodiments, power may be supplied through the I/O port 560 or by utilizing an internal power supply. Various embodiments may utilize additional components as well, such as an amplifier to amplify signals to the first and/or second actuators 510, 522. In one embodiment, the device 500 may comprise two or more sets of actuators, where at least one actuator in each set is configured to generate a first processor-controlled force, and at least one other actuator in each set is configured to generate a second processor-controlled force.

Figure 6:
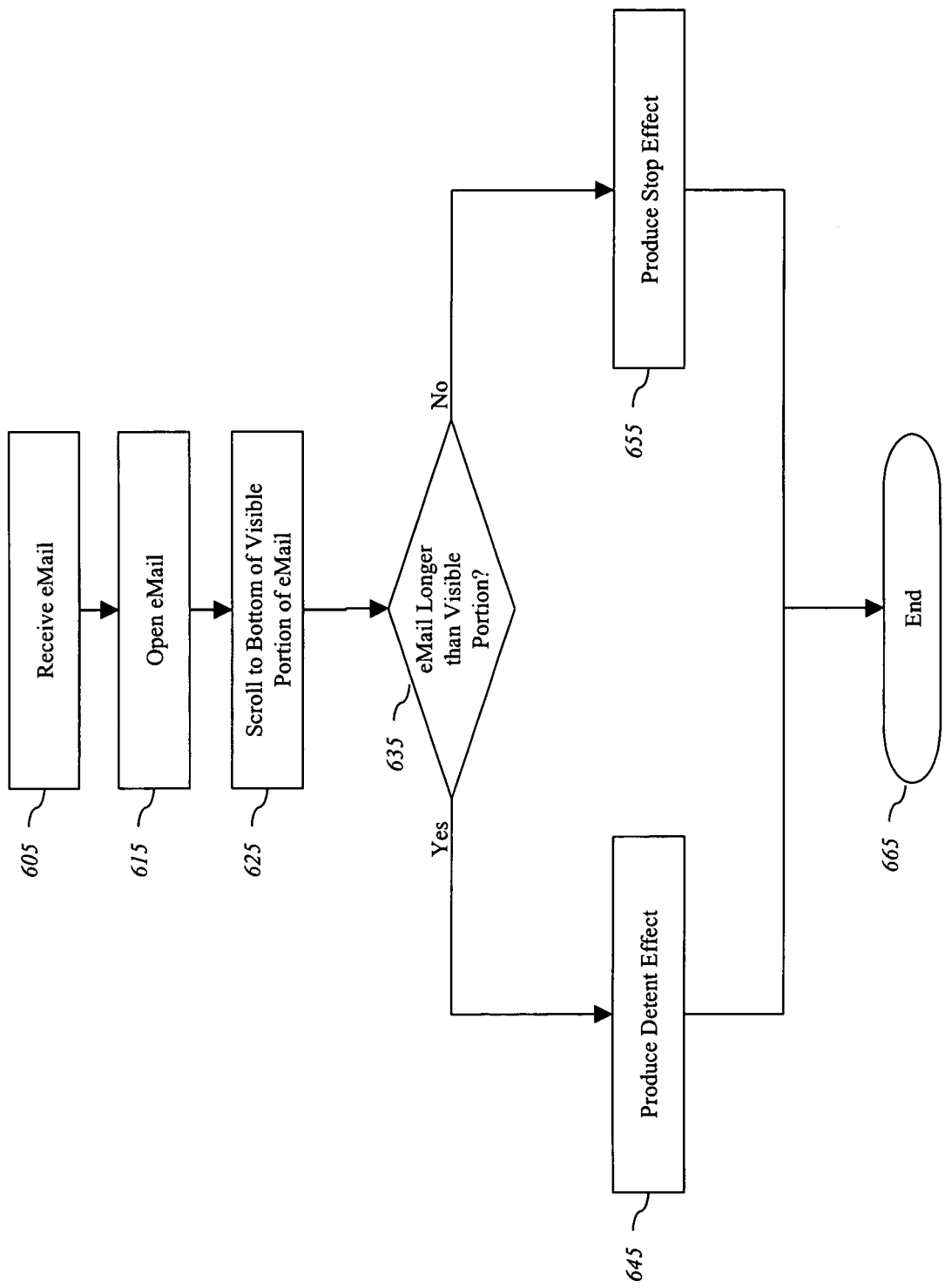
FIG. 6 is a flowchart, illustrating a process of navigating email utilizing a trackball pointing device utilizing one embodiment of the present invention in communication with a personal computer.

FIG. 6 is a flowchart illustrating a process of navigating email on a personal computer comprising a processor that is in communication with user interface device (such as a CRT monitor) and a trackball device (such as a wireless infrared trackball mouse comprising a battery power supply) utilizing an embodiment of the present invention. The method illustrated in FIG. 6 is described with reference to the device (100) shown in FIGS. 1-4. The device (100) comprises a substantially-spherical manipulandum (102). For example, the substantially-spherical manipulandum (102) may comprise a metal ball-bearing trackball. As shown in box 605, the user of the device (100) receives an email. Then, as shown in box 615, the user utilizes an interface device, such as button (104a), to open the email.

Using the substantially-spherical manipulandum (102), the user may then, as shown in box 625, scroll to the bottom of the email displayed on the user interface device (such as an LCD computer monitor) by rolling the substantially-spherical manipulandum (102) in the appropriate direction. A sensing device (140y) may then sense a coding on an encoder disk (138y) in direct or indirect communication with the substantially-spherical manipulandum (102) as described with respect to FIG. 4. From the coding, the sensing device (140y) may be able to ascertain, for example, the relative movement of the encoder disk (138y) in direct communication with a first actuator (110) and or a second actuator (122y) with respect to the sensing device (140y) and therefrom the relative movement or position of the substantially-spherical manipulandum (102). The sensing device (140y) may then send the sensed information in a sensing device output signal to the processor of the personal computer device the user is using to run an email viewing application.

The user interface device in communication with the personal computer may or may not be large enough to display the received email. The processor may then be able to determine whether the email message is longer than the visible portion of the user interface device as shown in box 635. If the email is longer than the visible portion of the screen, the processor that received the sensing device (140*y*) output signal may communicate with the first and/or second actuators (110, 122) as described with respect to FIGS. 2-4 by sending a feedback control signal. The feedback control signal may comprise an electric current supplied by a power supply to the first and/or second actuators (110, 122).

The first and/or second actuators (110, 122) may then receive the feedback control signal sent by the processor and, as shown in box 645, may cause a detent effect on the substantially-spherical manipulandum (102) by causing contact between a contacting surface such as a roller (120) and the substantially-spherical manipulandum (102). For example, the first actuator (110) may pivotably force the roller (120) towards the substantially-spherical manipulandum (102) with a light substantially-normal, first processor-controlled force while the second actuator (122) simultaneously applies a second processor-controlled force to the substantially-spherical manipulandum (102) by turning the roller (120). The contact between the roller (120) contacting surface and the substantially-spherical manipulandum (102) may create a resistance to the movement of the substantially-spherical manipulandum (102) in communication with the substantially-spherical manipulandum (102) over a short interval of time to create the detent effect. The user can overcome the detent haptic effect by continuing to scroll down through the email by turning the substantially-spherical manipulandum (102). The detent effect may provide an indicator to the user that he or she is scrolling beyond the visible portion of the email message. In one embodiment, the first actuator (110) may be slaved to the second actuator (122), and may be actuated whenever the second actuator (122) receives a feedback control signal from the processor.

Referring still to FIG. 6, if the email is not longer than the visible portion of the user interface device, the processor may send a different feedback control signal to the first and/or second actuators (110, 122) such as by supplying a stronger electric current. The feedback control signal may cause, for example, the first actuator (110) to generate a stronger substantially-normal, first processor-controlled force than is provided to create the detent effect in order to provide such a great normal force that the friction force applied to the substantially-spherical manipulandum (102) by the contacting surface roller (120) comprises a tangential force so great that the substantially-spherical manipulandum (102) cannot substantially be moved with respect to the roller (120). As shown in box 655, this contact may cause a stop effect in the device (100), comprising a strong resistance to further movement of the substantially-spherical manipulandum (102) by the user. Once the effect has been provided, the process ends as shown by box 665.

Various other types of effects may be utilized. For example, in one embodiment, the actuator may provide a "bump" when the end of the email is reached. If the user continues to scroll past the bump, the application may display the next email in the folder the user is currently viewing. In one embodiment, the second actuator (122) may be configured to apply a downhill effect by turning the substantially-spherical manipulandum (102) faster in the same direction that the user may be presently turning the substantially-spherical manipulandum (102).

Embodiments of the present invention may be utilized by a broad array of devices, including, without limitation, remote controls, pointing devices, editing devices, drawing devices, devices developed for visually-impaired users, cell phones, personal digital assistants, cameras, camcorders, MP3 players, and other electronic devices. For example, a cell phone may incorporate a trackball device according to this invention for use in navigating a menu structure. A television remote control may also incorporate an embodiment of the present invention for channel navigation, volume control, and other related functions. Similarly, an audio component remote control may utilize an embodiment for volume control or other audio control. A laptop computer may utilize an embodiment for navigation, volume control, or any other function utilizing a trackball or any other substantially-spherical manipulandum user interface device. PDA's, handheld navigation, and handheld email appliances may also benefit from utilizing an embodiment of the present invention.

A camera may utilize an embodiment of the present invention for user control of the focus, f-stop, menu navigation, and other camera-related functions. Since the effects provided by the actuator may be programmable, one manipulandum may be utilized to perform many or all of the functions on the camera. A video recorder may utilize an embodiment of the present invention to provide functions such as shuttle, fast forward, and reverse. An actuator may create detents on a frame-by-frame basis for the shuttle function and hard stops for fast forward and reverse.

The foregoing description of the embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the present invention.

That which is claimed:

1. An apparatus comprising:
   a housing;
   a substantially-spherical manipulandum;
   a lever arm pivotably coupled to the housing, and configured to apply a first processor-controlled force to the substantially-spherical manipulandum to provide a haptic effect; and
   a roller rotatably coupled to the lever arm configured to apply a second processor-controlled force to the substantially-spherical manipulandum, the second processor-controlled force being associated with the first processor-controlled force and generated by rotating the roller in a direction opposing the rotation of the substantially-spherical manipulandum.

2. The apparatus of claim 1, wherein the first processor-controlled force comprises a substantially-normal, processor-controlled force, the substantially-normal, processor controlled force directed substantially normal to a surface of the substantially-spherical manipulandum.

3. The apparatus of claim 1, wherein the haptic effect comprises a predetermined haptic effect.

4. The apparatus of claim 1, wherein the lever arm is configured to apply the first processor-controlled force to the substantially-spherical manipulandum via the roller.

5. The apparatus of claim 1, further comprising:
   a first actuator in communication with the lever arm configured to generate the first processor-controlled force; and
   a second actuator in communication with the roller configured to generate the second processor-controlled force.

6. The apparatus of claim 5, further comprising:
   a sensing device in communication with at least one of the substantially-spherical manipulandum, the lever arm, the roller, the first actuator, and the second actuator.

7. The apparatus of claim 6, wherein the sensing device is configured to sense a movement of at least one of the substantially-spherical manipulandum, the lever arm, the roller, the first actuator, and the second actuator.

8. The apparatus of claim 6, further comprising:
a processor in communication with the sensing device and at least one of the first actuator and the second actuator, wherein the processor is configured to control the generation of at least one of the first processor-controlled force and the second processor-controlled force.

9. The apparatus of claim 1, wherein the substantially-spherical manipulandum comprises a trackball.

* * * * *

UNITED STATES PATENT AND TRADEMARK OFFICE
CERTIFICATE OF CORRECTION

PATENT NO.        : 7,477,237 B2                                    Page 1 of 1
APPLICATION NO. : 10/859930
DATED              : January 13, 2009
INVENTOR(S)        : George Anastas et al.

It is certified that error appears in the above-identified patent and that said Letters Patent is hereby corrected as shown below:

On the Title Pg, Item (56) under U.S. Patent Documents, line 4, please delete "Cortyon", please insert -- Corlyon --.

On the Title Pg, Item (56) under U.S. Patent Documents, line 7, please delete "Frosch et al.", please insert -- Salisbury --.

Page 2, Item (56) under Foreign Patent Documents, please insert -- DE 4400790 5/1995 --.

Page 2, Item (56) under Other Publications, please insert -- Adelstein, "A Virtual Environment System For The Study of Human Arm Tremer," Ph.D Dissertation, Dept. of Mechanical Engineering, MIT, June 1989. --.

Page 2, Item (56) under Other Publications, Line 61, After "CH2413-3/87/0000/0318501.00", please delete "1987".

Page 2, Item (56) under Other Publications, Line 72, please delete "deFiguelredo", please insert -- deFigueiredo --.

Column 8, line 18 (Approx.), please delete "his", please insert -- is --.

Signed and Sealed this

Eighth Day of September, 2009

David J. Kappos
*Director of the United States Patent and Trademark Office*